US007449039B2

(12) United States Patent
Hong et al.

(10) Patent No.: US 7,449,039 B2
(45) Date of Patent: Nov. 11, 2008

(54) CYCLONIC CLEANER

(75) Inventors: Seung Gee Hong, Yongin-Si (KR); Jun Hwa Lee, Anyang-Si (KR)

(73) Assignee: Samsung Electronics Co., Ltd., Suwon (KR)

( * ) Notice: Subject to any disclaimer, the term of this patent is extended or adjusted under 35 U.S.C. 154(b) by 590 days.

(21) Appl. No.: 11/182,854

(22) Filed: Jul. 18, 2005

(65) Prior Publication Data

US 2006/0150587 A1 Jul. 13, 2006

(30) Foreign Application Priority Data

Jan. 7, 2005 (KR) ..................... 10-2005-0001717

(51) Int. Cl.
*B01D 45/12* (2006.01)

(52) U.S. Cl. ............................ 55/343; 55/349; 55/429; 55/459.1; 55/DIG. 3

(58) Field of Classification Search ................... 55/343, 55/346, 349, 459.1, DIG. 3
See application file for complete search history.

(56) References Cited

U.S. PATENT DOCUMENTS 1,940,196 A * 12/1933 Wagner ....................... 55/343
7,097,680 B2 * 8/2006 Oh .............................. 55/343
7,128,770 B2 * 10/2006 Oh et al. ....................... 55/343

FOREIGN PATENT DOCUMENTS

JP 10-263439 A 10/1998
JP 2003-144978 A 5/2003
WO WO 02/067755 A1 9/2002

* cited by examiner

*Primary Examiner*—Robert A Hopkins
(74) *Attorney, Agent, or Firm*—Sughrue Mion, PLLC

(57) ABSTRACT

A cyclone cleaner that enables noise frequencies generated in a plurality of cyclone chambers to be different from one another, thereby preventing noise from overlapping at a specific frequency bandwidth, and therefore, reducing noise. The cyclonic cleaner includes a suction unit, a cyclonic separating apparatus, and a blowing unit. The cyclonic separating apparatus includes a housing, a plurality of cyclone chambers disposed in the housing in the circumferential direction thereof, and a plurality of partitions disposed between the respective cyclone chambers to mount the cyclone chambers in a plurality of individual divided spaces, respectively. The partitions are arranged such that angles between the respective adjacent pairs of partitions are different from one another. Also, the partitions are arranged such that the intervals between the respective partitions are different from one another, and the divided spaces have different capacities.

13 Claims, 4 Drawing Sheets

CYCLONIC CLEANER

CROSS-REFERENCE TO RELATED APPLICATION

This application claims priority from Korean Patent Application No. 2005-1717, filed on Jan. 7, 2005 in the Korean Intellectual Property Office, the disclosure of which is incorporated herein by reference.

BACKGROUND OF THE INVENTION

1. Field of the Invention

The present invention relates to a cyclonic cleaner incorporating a cyclonic separating apparatus to separate dust and foreign matter from air using centrifugal force.

2. Description of the Related Art

Generally, a vacuum cleaner is a device that suctions air using suction force of a blowing unit and separates dust and foreign matter from the suctioned air using a filter to clean the room.

Recently, cyclonic cleaners have been developed which incorporate a cyclonic separating apparatus that generates helical flow from suctioned air, separates dust and foreign matter from the suctioned air using centrifugal force of the helical flow, and easily removes the separated dust and foreign matter, instead of using a filter to separate dust and foreign matter from air.

One example of a cyclonic cleaner is disclosed in WO 02/067755 A1, which describes a cyclonic cleaner comprising a plurality of cyclone chambers, to generate helical flow, arranged in parallel with one another to separate dust and foreign matter from suctioned air using the cyclone principle.

In the conventional cyclonic cleaner, however, the cyclone chambers disposed in the cyclonic cleaner have the same size and shape, and the cyclone chambers communicate with one another. As a result, noise generated in the respective cyclone chambers overlaps, and therefore, great flow noise is generated. In other words, noise frequency of a specific bandwidth generated in the respective cyclone chambers harmonizes, i.e., noise overlaps. Consequently, the noise is very large.

Furthermore, the conventional cyclone cleaner does not have a structure that air is effectively guided to the respective cyclone chambers. As a result, helical flow is not smoothly generated, and therefore, dust and foreign matter are not effectively separated from air in the respective cyclone chambers.

SUMMARY OF THE INVENTION

Therefore, it is an aspect of the invention to provide a cyclone cleaner that enables noise frequencies generated in a plurality of cyclone chambers to be different from one another, thereby preventing noise from overlapping at a specific frequency bandwidth, and therefore, reducing noise.

It is another aspect of the invention to provide a cyclone cleaner that is capable of effectively guiding air to the respective cyclone chambers, thereby effectively separating dust and foreign matter from the air in the respective cyclone chambers.

In accordance with one aspect, the present invention provides a cyclonic cleaner incorporating a cyclonic separating apparatus, wherein the cyclonic separating apparatus comprises: a housing; a plurality of cyclone chambers disposed in the housing in the circumferential direction thereof; and a plurality of partitions disposed between the respective cyclone chambers to mount the cyclone chambers in a plurality of individual divided spaces, respectively.

It may be preferable that the partitions are arranged such that angles between the respective adjacent pairs of partitions are different from one another.

It may be preferable that the partitions are arranged such that the intervals between the respective partitions are different from one another, whereby the divided spaces have different capacities.

The housing comprises an outer container and an inner container, and the cyclone chambers are disposed in the outer container.

The cyclonic separating apparatus further comprises: a first cyclone chamber mounted at the center of the upper part of the inner container to firstly filter air, and the cyclone chambers are second cyclone chambers mounted at the upper part of the outer container to secondarily filter the air having passed through the first cyclone chamber.

The inner container and the outer container are covered by an upper plate having a plurality of communication holes 24 disposed in the circumferential direction thereof, and the first cyclone chamber communicates with the respective second cyclone chambers through a plurality of guide members to connect the communication holes and the second cyclone chambers, respectively.

It may be preferable that each of the guide members is formed in a helical shape such that air flows helically in each of the guide members.

Each of the second cyclone chambers is formed in a conical shape with the sectional area gradually decreasing from the upper end to the lower end, the guide members are connected to the edges of the upper ends of the second cyclone chambers, respectively, such that air having passed through the respective guide members flows helically while being introduced to the inner circumferential surfaces of the second cyclone chambers.

Each of the second cyclone chambers has a discharge port formed at the center of the upper end thereof, through which air having flowed helically and then upward in the corresponding second cyclone chamber is discharged out of the corresponding second cyclone chamber.

Also, the housing has an air inlet port formed at the side thereof, which communicates with the first cyclone chamber, and the housing has an air outlet port formed at the top thereof, which communicates with the respective second cyclone chambers.

Also, the inner container has a first collection part disposed at the lower part thereof to collect dust and foreign matter firstly separated from air by the first cyclone chamber, and the outer container has a second collection part disposed at the lower part thereof to collect dust and foreign matter secondarily separated from air by the second cyclone chambers.

Also, the housing is configured such that the housing can be divided into the upper and lower parts by a connection part approximately provided at the middle thereof so as to empty dust and foreign matter from the first and second collection parts.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE ILLUSTRATIVE NON-LIMITING EMBODIMENTS OF THE INVENTION

Reference will now be made in detail to the exemplary embodiment of the present invention. The exemplary embodiment is described below to explain the present invention by referring to the figures. The described exemplary embodiments are intended to assist in the understanding of the invention, and are not intended to limit the scope of the invention in any way.

Figure 1:
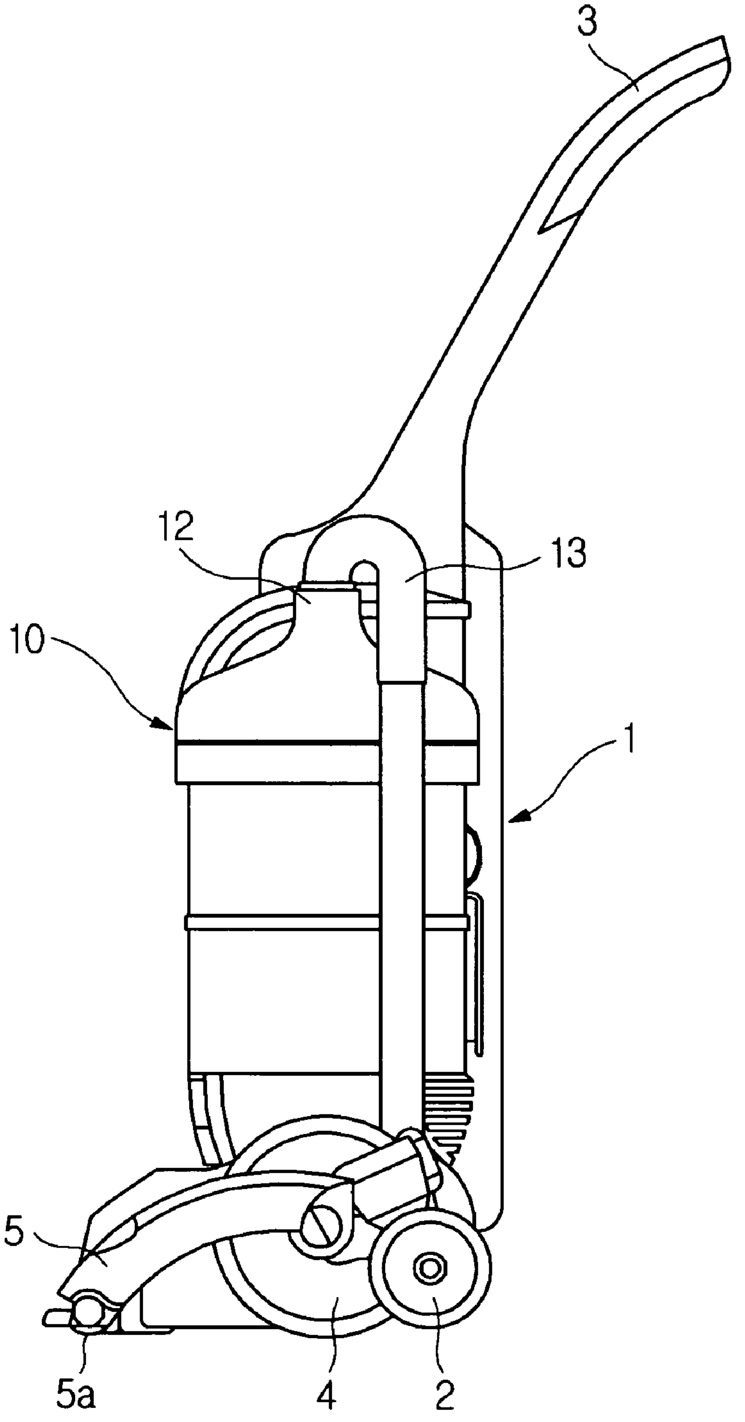
FIG. 1 is a perspective view showing the appearance of a cyclonic cleaner according to an exemplary embodiment of the present invention.

FIG. 1 is a perspective view showing the appearance of a cyclonic cleaner according to an exemplary embodiment of the present invention. As shown in FIG. 1, the cyclone cleaner comprises: an upstanding body 1 having moving wheels 2 mounted to the lower end thereof and a handle 3 mounted at the upper part thereof; a blowing unit 4 mounted at the lower part of the upstanding body 1; a suction unit 5 to guide suction of air and foreign matter from a room floor; and a cyclonic separating apparatus 10 releasably mounted to the upstanding body 1 above the blowing unit 4 to separate foreign matter from air blown from the blowing unit 4 and collect the separated foreign matter.

The suction unit 5 is formed in the shape of a duct having an air suction port 5*a* located at the end adjacent to the room floor. The suction unit 5 is mounted to the blowing unit 4. A flow channel connected to the suction unit 5 is not shown in detail in the drawings, although the flow channel may be connected to an air inlet port 11 (see FIGS. 2 and 3) of the cyclonic separating apparatus 10, which will be described below, via a common pipe or hose to guide air and foreign matter to the air inlet port 11.

The blowing unit 4 comprises a blowing fan to generate suction force and a motor to driving the blowing fan, which are not shown in detail in the drawings. The blowing unit 4 is connected to an outlet guide pipe 13, which extends downward from the air outlet port 12 (see FIGS. 2 and 3) of the cyclonic separating apparatus 10. Consequently, cleaned air, from which foreign matter has been separated while having passed through the cyclonic separating apparatus 10, is introduced into the blowing unit 4 through the outlet guide pipe 13, and is then discharged into the room.

The cyclonic separating apparatus 10 disposed above the blowing unit 4 is releasably mounted to the upstanding body 1 by means of a clamping unit (not shown). The interior structure of the cyclonic separating apparatus 10 will be described in detail below with reference to FIGS. 2 and 4.

Figure 2:
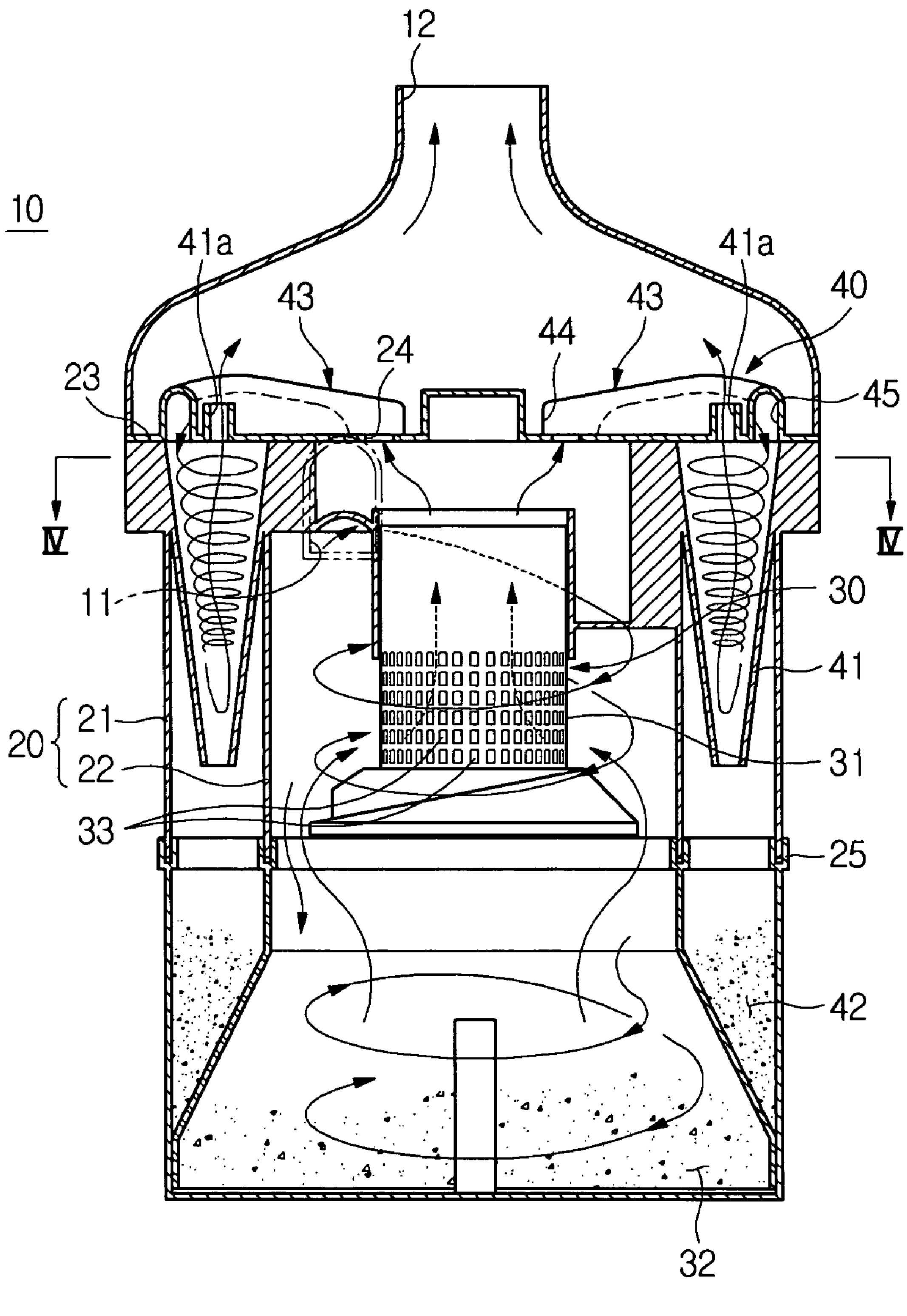
FIG. 2 is a longitudinal sectional view showing a cyclonic separating apparatus according to an exemplary embodiment of the present invention shown in FIG. 1.

FIG. 2 is a longitudinal sectional view showing the cyclonic separating apparatus 10 according to the present invention shown in FIG. 1. As shown in FIG. 2, the cyclonic separating apparatus 10 comprises: a housing 20 consisting of an outer container 21 approximately formed in the shape of a cylinder and an inner container 22 disposed in the outer container 21; a first cyclone unit 30 mounted in the inner container 22 to firstly filter dust and foreign matter from suctioned air; a second cyclone unit 40 mounted in the outer container 21 to secondarily filter fine dust from the air having passed through the first cyclone unit 30.

Figure 3:
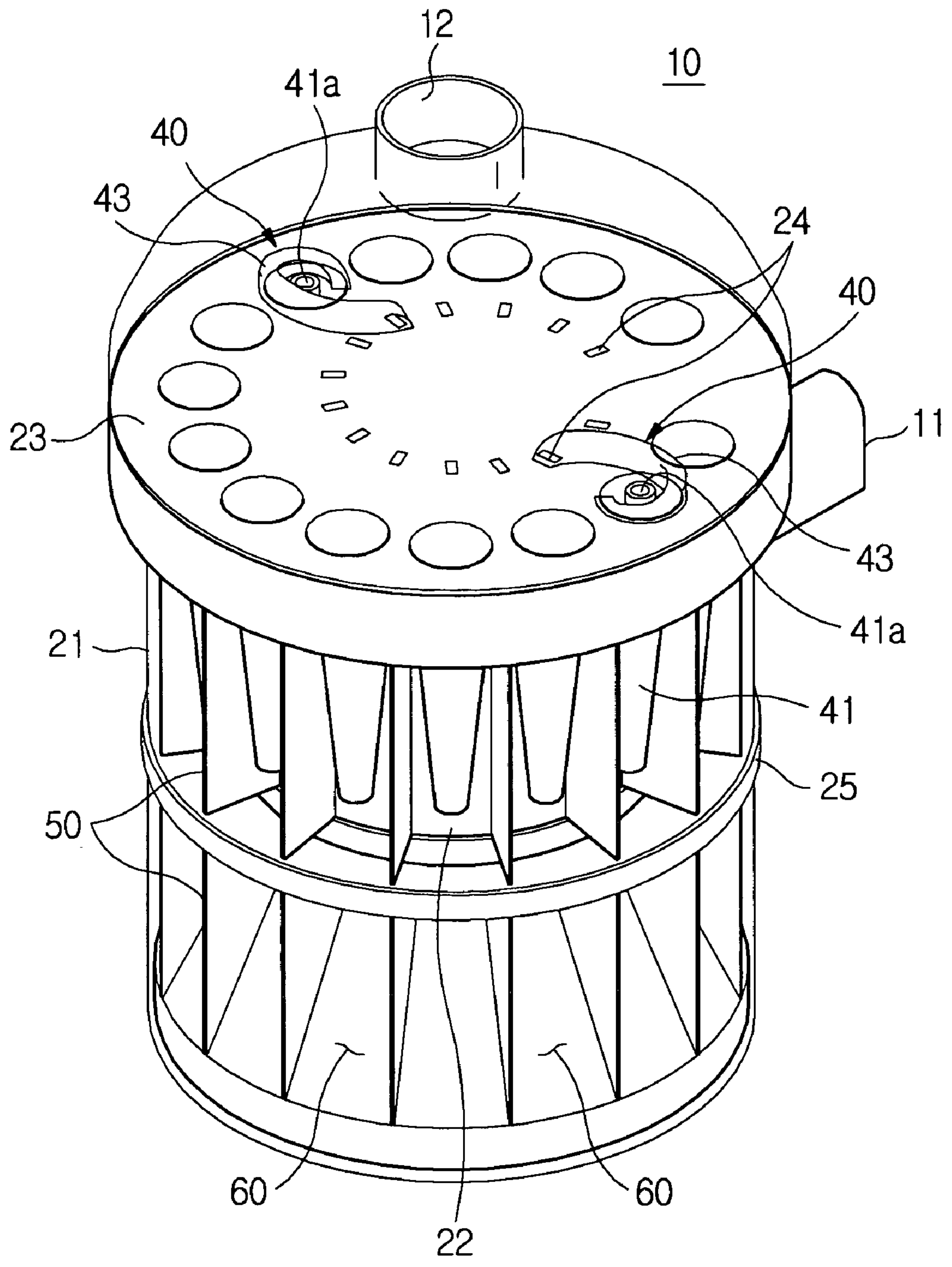
FIG. 3 is a perspective view schematically showing the interior of the cyclonic separating apparatus shown in FIG. 2, in which cyclone chambers are partitioned from one another by a plurality of partitions.

The outer container 21 and the inner container 22 are partitioned from each other by an upper plate 23 to cover the upper ends of the outer container 21 and the inner container 22, and the outer container 21 and the inner container 22 communicate with each other through a plurality of communication holes 24 spaced a predetermined distance from one another to form a concentric circle (see FIG. 3).

The air inlet port 11 of the cyclonic separating apparatus 10 is provided at the side of the housing 20 to communicate with the first cyclone unit 30. The air outlet port 12 of the cyclonic separating apparatus 10 is provided at the top of the housing 20 to communicate with the second cyclone unit 40.

The first cyclone unit 30 comprises: a first cyclone chamber 31 approximately formed in the shape of a cylinder and mounted at the center of the upper part of the inner container 22; and a first collection part 32 disposed at the lower part of the inner container 22 to collect dust and foreign matter firstly separated from air by the first cyclone chamber 31.

The second cyclone unit 40 comprises: a plurality of second cyclone chambers 41 having the same shape and size and disposed in the circumferential direction thereof above the outer container 21; a second collection part 42 disposed at the lower part of the outer container 21 to collect dust and foreign matter secondarily separated from air by the second cyclone chambers 41; and a plurality of guide members 43 to guide air having passed through the first cyclone chamber 31 to the respective second cyclone chambers 41.

The housing 20 is formed such that the housing 20 can be divided into the upper and lower parts by a connection part 25 approximately provided at the middle thereof so as to empty dust and foreign matter from the first and second collection parts 32 and 42.

The air inlet port 11 is disposed at the upper part of the housing 20 while communicating with the first cyclone unit 30. At the circumferential surface of the first cyclone chamber 31 having the open upper end are formed a plurality of vent holes 33. Consequently, air introduced into the first cyclone unit 30 through the air inlet port 11 flows helically between the outer circumferential surface of the first cyclone chamber 31 and the inner circumferential surface of the inner container 22, and therefore, dust and foreign matter are separated from air by centrifugal force and then collected in the first collection part 32. The air firstly filtered by the first cyclone unit 30 is introduced into the first cyclone chamber 31 through the vent holes 33, and then flows upward.

Each second cyclone chamber 41 has a closed upper end and an open lower end, and is formed in a conical shape with the sectional area gradually decreasing from the upper end to the lower end. At the center of the upper end of each second cyclone chamber 41 is formed a discharge port 41*a*, through which air introduced into each second cyclone chamber 41 through the corresponding guide member 43 is discharged upward.

Each guide member 43 comprises: an inlet part 44 disposed at the corresponding communication hole 24 of the upper plate 23, while communicating with the first cyclone chamber 31, to guide air having passed through the first cyclone chamber 31 to the corresponding second cyclone chamber 41; and an outlet part 45 communicating with the corresponding second cyclone chamber 41. Each guide member 43 is approximately formed in a helical shape (see FIG. 3).

Each outlet part 45 is disposed toward the inner circumferential surface of the corresponding second cyclone chamber 41 such that air flowing along the helical guide member 43 is guided to the inner circumferential surface of the corresponding second cyclone chamber 41 to generate helical flow in the corresponding second cyclone chamber 41.

Consequently, air introduced into the inlet parts 44 of the guide members 43 from the first cyclone unit 30 flows helically along the helical guide members 43, and then moves to the outlet parts 45 of the guide members 43. Subsequently, the air flows helically downward along the inner circumferential surfaces of the second cyclone chambers 41. At this time, dust and foreign matter are separated from the air by centrifugal force in the respective second cyclone chambers 41, and are then collected in the second collection part 42. The secondarily filtered air moves upward, and is then discharged out of the cyclonic separating apparatus 10 through the discharge ports 41*a* and the air outlet port 12.

The second cyclone chambers 41 are partitioned from one another by a plurality of partitions 50, which are disposed between the respective second cyclone chambers 41 in the outer container 21. This arrangement will be described in detail below with reference to FIGS. 3 and 4.

Figure 4:
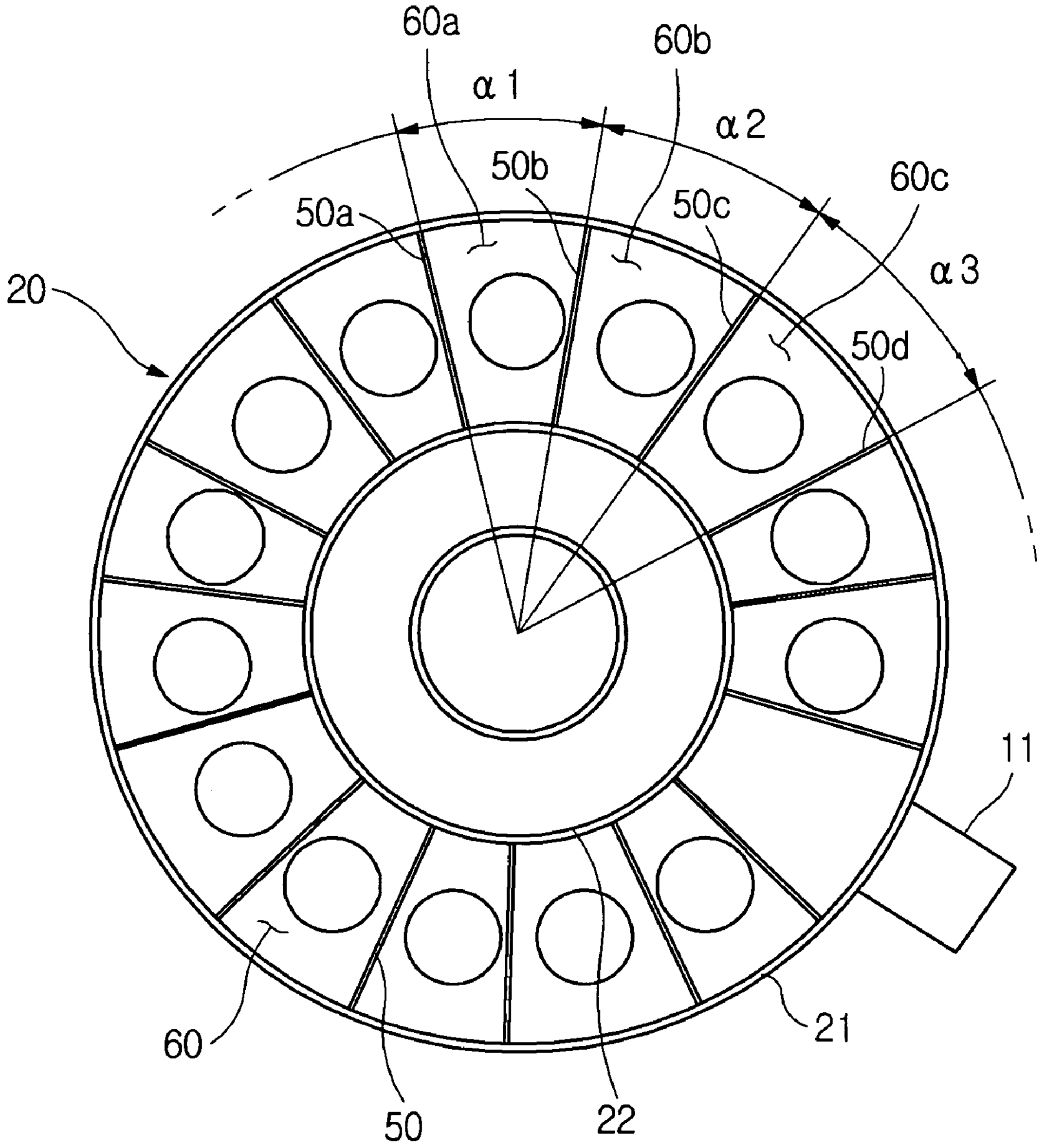
FIG. 4 is a cross-sectional view taken along the line IV-IV of FIG. 2, showing the partitions arranged such that angles between the respective adjacent pairs of partitions, by which the cyclone chambers are partitioned, are different from one another.

FIG. 3 is a perspective view schematically showing the interior of the cyclonic separating apparatus shown in FIG. 2, in which cyclone chambers are partitioned from one another by a plurality of partitions, and FIG. 4 is a cross-sectional view taken along the line IV-IV of FIG. 2, showing the partitions arranged such that angles between the respective adjacent pairs of partitions, by which the cyclone chambers are partitioned, are different from one another.

As shown in FIG. 3, the second cyclone chambers 41 are disposed in the circumferential direction thereof in the outer container 21, and the guide members 43 are approximately formed in the shape of a helical duct to connect the communication holes 24 communicating with the first cyclone unit 30 and the second cyclone chambers 41, respectively. (For the purpose of clarity, only two guide members are shown in FIG. 3.)

Each partition 50 has the upper end connected to the upper end of the outer container 21 and the lower end connected to the lower end of the outer container 21. Also, each partition 50 has the front end connected to the outer circumferential surface of the inner container 22 and the rear end connected to the inner circumferential surface of the outer container 21. The partitions 50 are disposed in a radial direction thereof between the respective second cyclone chambers 41 to partition the second cyclone chambers 41 into individual divided spaces 60, respectively.

As shown in FIG. 4, the partitions 50 are arranged such that angles between the respective adjacent pairs of partitions 50 are different from one another, and the intervals between the respective partitions 50 are different from one another.

Specifically, the angle $\alpha$1 between an adjacent pair of partitions 50*a* and 50*b* is different from the angle $\alpha$2 between another adjacent pair of partitions 50*b* and 50*c*, which is next to the adjacent pair of partitions 50*a* and 50*b*, and the angle $\alpha$2 between another adjacent pair of partitions 50*b* and 50*c* is also different from the angle $\alpha$3 between yet another adjacent pair of partitions 50*c* and 50*d*, which is next to the adjacent pair of partitions 50*b* and 50*c*. Also, the intervals between the partitions 50*a*, 50*b* and 50*c* are different from one another. Consequently, the divided spaces 60*a*, 60*b* and 60*c* have different capacities and shapes.

According to the above-stated structure, air flowing helically in the respective second cyclone chambers 41 does not meet one another below the second cyclone chambers, and therefore, collision noise is not generated. Also, the noise frequencies generated due to flow of air in the respective divided spaces 50 between which the second cyclone chambers 41 are disposed are different from one another, and therefore, noise is prevented from overlapping at a specific frequency bandwidth.

Now, the operation of the cyclonic cleaner with the above-stated construction according to an exemplary embodiment of the present invention will be described.

As the blowing unit 4 is operated, dust and foreign matter on the room floor are introduced along with air into the first cyclone unit 30 mounted in the inner container 22 through the air suction port 5*a* of the suction unit 5 and the air inlet port 11 of the cyclonic separating apparatus 10.

The air introduced into the first cyclone unit 30 flows helically downward between the outer circumferential surface of the first cyclone chamber 31 and the inner circumferential surface of the inner container 22 such that dust and foreign matter are firstly separated from the air, and are then collected in the first collection part 32. The firstly filtered air is introduced into the first cyclone chamber 31 through the vent holes 33, and then flows upward to pass through the interior of the first cyclone chamber 31.

The air having passed through the first cyclone chamber 31 flows helically along the guide members 43, and is then introduced into the second cyclone chambers 41 of the second cyclone unit 40. Subsequently, the air flows helically downward along the inner circumferential surfaces of the respective second cyclone chambers 41.

As the air flows helically in the respective second cyclone chambers 41, dust and foreign matter which have not been filtered at the first cyclone unit 30 are separated from the air, and are then collected in the second collection part 42. The secondarily filtered air flows upward along the central axes of the second cyclone chambers 41, and passes through the discharge ports 41*a*.

The air having passed through the discharge ports 41*a* of the second cyclone chamber 41 is discharged out of the housing 20 through the air outlet port 12 provided at the top of the housing 20, is guided downward along the outlet guide pipe 13, and is then discharged out of the cyclonic cleaner through the blowing unit 4.

While the air flows from the second cyclone chambers 41 to the air outlet port 12, noise frequency may overlap at a specific bandwidth, and therefore, great flow noise may be generated. Also, the air having passed through the lower ends of the second cyclone chambers 41 may meet one another, and therefore, collision noise may be generated. In the cyclonic separating apparatus 10 according to an exemplary embodiment of the present invention, however, the second cyclone chambers 41 are mounted in the divided spaces 60 partitioned by the partitions 50, the partitions 50 are arranged such that angles between the respective adjacent pairs of partitions 50 are different from one another, and capacities and shapes of the divided spaces 60 defined by the respective adjacent pairs of partitions 50 are different from one another. Consequently, overlap of noise at a specific frequency and collision of air are prevented, and therefore, flow noise is considerably reduced.

As apparent from the above description, the cyclonic cleaner according to an exemplary embodiment of the present invention is capable of separating dust and foreign matter from air twice, easily removing the separated dust and foreign matter, and preventing overlap of noise at a specific frequency and collision of air. Consequently, an exemplary embodiment of the present invention has the effect of considerably reducing noise and improving the performance and convenience of the cyclonic cleaner.

Although an exemplary embodiment of the present invention has been shown and described, the invention is not limited to this embodiment. It would be appreciated by those skilled in the art that changes may be made in this embodiment without departing from the principles and spirit of the invention, the scope of which is defined in the claims and their equivalents.

What is claimed is:

1. A cyclonic cleaner incorporating a cyclonic separating apparatus, wherein the cyclonic separating apparatus comprises:

a housing;

a plurality of cyclone chambers disposed in the housing in the circumferential direction thereof; and a plurality of partitions disposed between the respective cyclone chambers to mount the cyclone chambers in a plurality of individual divided spaces, respectively, wherein the partitions are arranged such that angles between the respective adjacent pairs of partitions are different from one another.

2. The cyclonic cleaner according to claim 1, wherein the housing comprises an outer container and an inner container, and the cyclone chambers are disposed in the outer container.

3. The cyclonic cleaner according to claim 2, wherein the cyclonic separating apparatus further comprises: a first cyclone chamber mounted at a center of an upper part of the inner container to firstly filter air, and the cyclone chambers are second cyclone chambers mounted at the upper part of the outer container to secondarily filter the air having passed through the first cyclone chamber.

4. The cyclonic cleaner according to claim 3, wherein the inner container and the outer container are covered by an upper plate having a plurality of communication holes disposed in the circumferential direction thereof, and the first cyclone chamber communicates with the respective second cyclone chambers through a plurality of guide members to connect the communication holes and the second cyclone chambers, respectively.

5. The cyclonic cleaner according to claim 4, wherein each of the guide members is formed in a helical shape such that air flows helically in each of the guide members.

6. The cyclonic cleaner according to claim 5, wherein each of the second cyclone chambers is formed in a conical shape with the sectional area gradually decreasing from an upper end to a lower end, the guide members are connected to the edges of the upper ends of the second cyclone chambers, respectively, such that air having passed through the respective guide members flows helically while being introduced to the inner circumferential surfaces of the second cyclone chambers.

7. The cyclonic cleaner according to claim 6, wherein each of the second cyclone chambers has a discharge port formed at the center of the upper end thereof, through which air having flowed helically and then upward in the corresponding second cyclone chamber is discharged out of the corresponding second cyclone chamber.

8. The cyclonic cleaner according to claim 3, wherein the housing has an air inlet port formed at the side thereof, which communicates with the first cyclone chamber, and an air outlet port formed at the top thereof, which communicates with the respective second cyclone chambers.

9. The cyclonic cleaner according to claim 3, wherein the inner container has a first collection part disposed at a lower part thereof to collect dust and foreign matter firstly separated from air by the first cyclone chamber, and the outer container has a second collection part disposed at a lower part thereof to collect dust and foreign matter secondarily separated from air by the second cyclone chambers.

10. The cyclonic cleaner according to claim 9, wherein the housing is configured such that the housing can be divided into the upper and lower parts by a connection part approximately provided at the middle thereof so as to empty dust and foreign matter from the first and second collection parts.

11. A cyclonic cleaner incorporating a cyclonic separating apparatus, wherein the cyclonic separating apparatus comprises:

a housing;

a plurality of cyclone chambers disposed in the housing in the circumferential direction thereof; and a plurality of partitions disposed between the respective cyclone chambers to mount the cyclone chambers in a plurality of individual divided spaces, respectively, wherein the partitions are arranged such that the intervals between the respective partitions are different from one another, whereby the divided spaces have different capacities.

12. A cyclonic cleaner comprising:

a body having a plurality of moving wheels and a handle;

a suction unit disposed below the body;

a cyclonic separating apparatus releasably mounted to the body; and a blowing unit to enable air suctioned through the suction unit to be discharged via the cyclonic separating apparatus, wherein the cyclonic separating apparatus comprises:

a housing;

a plurality of cyclone chambers disposed in the housing in the circumferential direction thereof; and a plurality of partitions disposed between the respective cyclone chambers to mount the cyclone chambers in a plurality of individual divided spaces, respectively, wherein the partitions are arranged such that angles between the respective adjacent pairs of partitions are different from one another.

13. A cyclonic cleaner comprising:

a body having a plurality of moving wheels and a handle;

a suction unit disposed below the body;

a cyclonic separating apparatus releasably mounted to the body; and a blowing unit to enable air suctioned through the suction unit to be discharged via the cyclonic separating apparatus, wherein the cyclonic separating apparatus comprises:

a housing;

a plurality of cyclone chambers disposed in the housing in the circumferential direction thereof; and a plurality of partitions disposed between the respective cyclone chambers to mount the cyclone chambers in a plurality of individual divided spaces, respectively, wherein the partitions are arranged such that the intervals between the respective partitions are different from one another, whereby the divided spaces have different capacities.

* * * * *